UNITED STATES PATENT OFFICE.

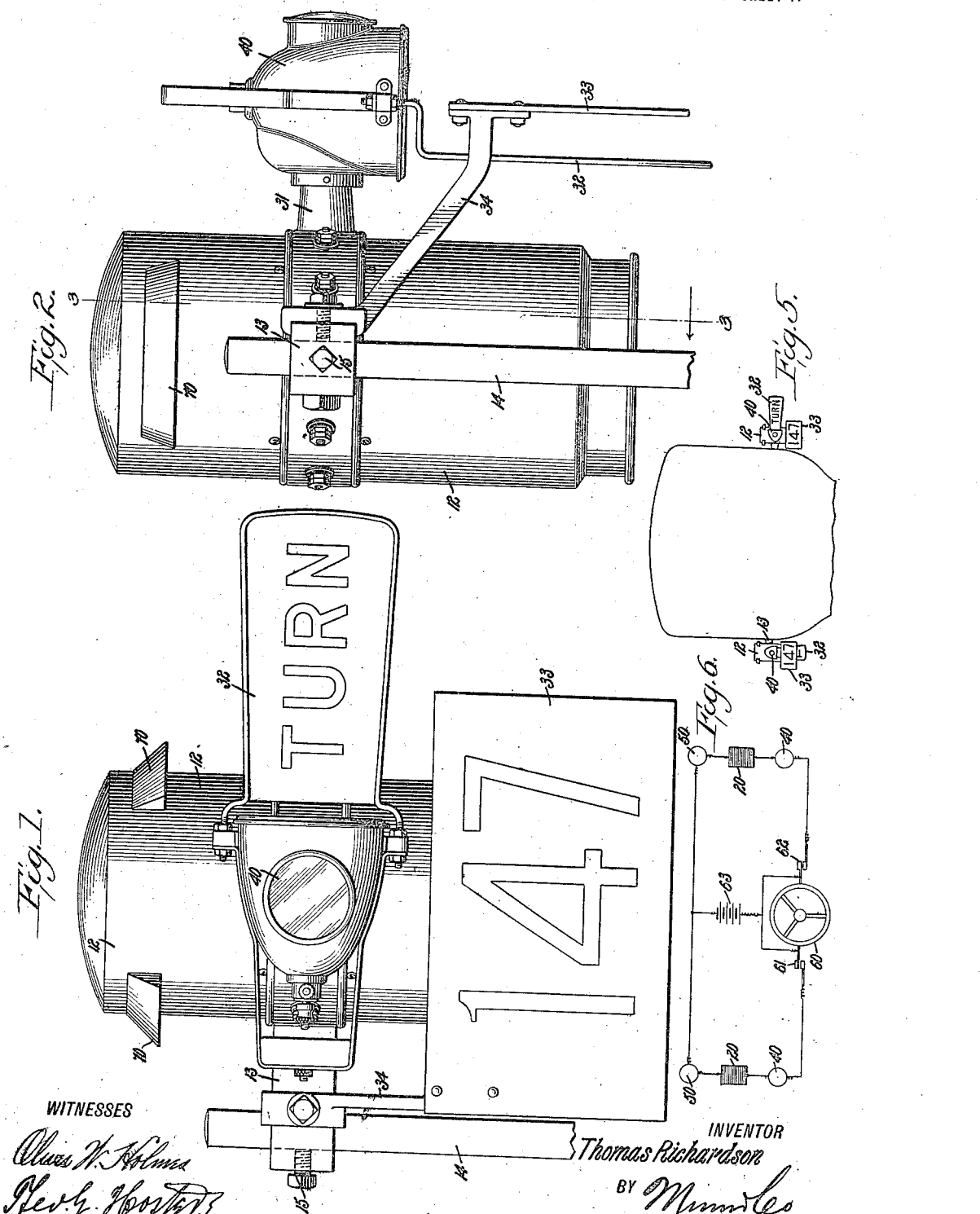

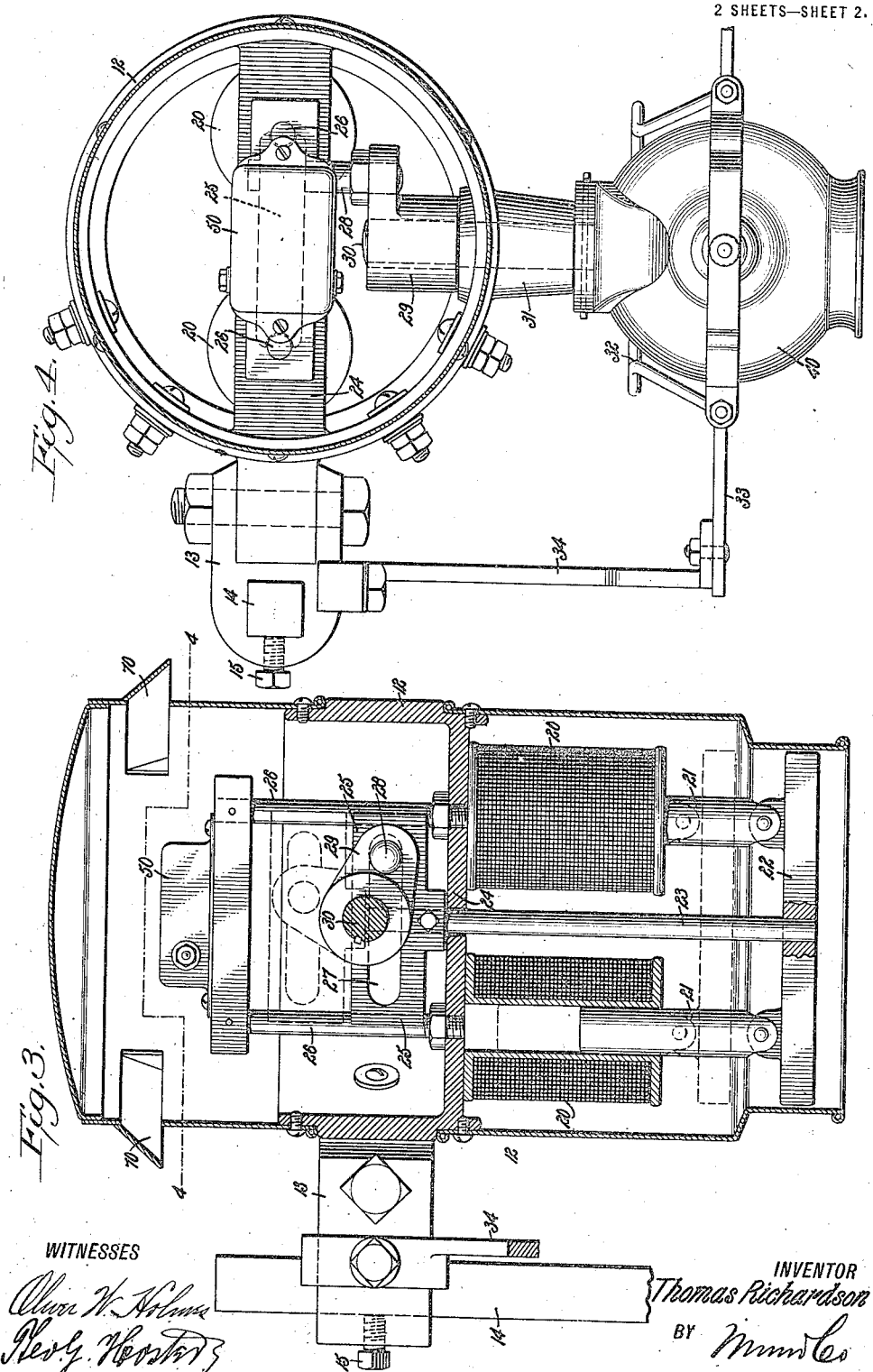

THOMAS RICHARDSON, OF NEW ORLEANS, LOUISIANA, ASSIGNOR OF ONE-HALF TO GEORGE DOWNIN, OF NEW ORLEANS, LOUISIANA.

SIGNALING DEVICE.

1,208,656.  Specification of Letters Patent.  Patented Dec. 12, 1916.

Application filed March 28, 1916. Serial No. 87,197.

*To all whom it may concern:*

Be it known that I, THOMAS RICHARDSON, a citizen of the United States, and a resident of New Orleans, in the parish of Orleans and State of Louisiana, have invented a new and Improved Signaling Device, of which the following is a full, clear, and exact description.

The object of the invention is to provide a new and improved signaling device more especially designed for use on automobiles, auto-trucks and other similar vehicles, and arranged to enable the operator of the vehicle to display a signal to a following vehicle to prevent accidents when stopping or turning out.

In order to accomplish the desired result, use is made of a sign, a shaft carrying the said sign and provided with a crank arm, a crosshead engaged by the said crank arm, and an electrical actuating device under the control of an operator and connected with the said crosshead to impart a sliding motion to the same with a view to turn the said shaft and to swing the signal into or out of display position.

A practical embodiment of the invention is represented in the accompanying drawings forming a part of this specification, in which similar characters of reference indicate corresponding parts in all the views.

Figure 1 is an elevation of the signaling device with the sign in display position; Fig. 2 is a side elevation of the same with the sign in non-display position; Fig. 3 is an enlarged vertical section of the same on the line 3—3 of Fig. 2; Fig. 4 is a plan view of the same with the casing in section on the line 4—4 of Fig. 3; Fig. 5 is an end elevation of an automobile provided on each side with a signaling device; and Fig. 6 is a diagrammatic view showing the electrical connections between the switches on the steering wheel, the electrical actuating device, the electric lamp and the electric alarm.

As shown in Fig. 5, the automobile 10 or similar vehicle is provided on each side with a signaling device, but as both signaling devices are alike in construction it suffices to describe but one in detail. Each of the signaling devices is mounted on a casing 12 which includes a cup shaped member provided with a bracket 13 attached to a post 14 fastened to the automobile at a convenient part thereof, the bracket 13 being adjustably secured to the post 14 by a set screw 15 to allow of raising or lowering the signaling device to suit existing circumstances. The casing also includes an upper cap member arranged above and detachably secured to the cup, and a lower member arranged below and detachably secured to the cup. Within the casing 12 below a partition formed by the floor 24 of the cup is arranged a pair of solenoids 20 having movable cores or armatures 21 pivotally connected with each other at their outer ends by a crossbar 22 on which is secured a rod 23 extending upward between the solenoids 20. The upper portion of the rod 23 is mounted to slide through an opening in the horizontal partition 24 and the upper end of this rod 23 is secured to a crosshead 25 arranged above the partition and mounted to slide up and down in suitable guideways 26 attached to the partition 24. The crosshead 25 is provided with a horizontally disposed slot 27 engaged by the wrist pin 28 of a crank 29 secured on a shaft 30 journaled in a suitable bearing 31 arranged on the casing 12. On the outer end of the shaft 30 is secured a sign 32 preferably in the form of an arm extending normally in a vertical position, as shown in Fig. 2, so as to extend intermediate the casing 12 and the license plate 33 supported by a bracket 34 attached to the bracket 13. Thus the legend produced on the sign 32 is not visible as long as the sign is in vertical non-display position. On the sign 32 and in axial alinement with the shaft 31 is arranged an electric lamp 40 which is normally not burning, that is, during the time the sign 32 is in inactive vertical position as previously explained. When the sign 32 is in this inactive position the several parts within the casing 12 are in the position shown in Fig. 3 with the solenoids deënergized. Now when the solenoids are energized and the armatures 21 are caused to slide upward then the crossbar 22 and the rod 23 are lifted and with them the crosshead 24 so that a swinging motion is given to the crank arm 29 to turn the shaft 30 and with it the sign 32. When this takes place the sign 32 swings from its normal vertical position into horizontal display position, as indicated in Fig. 1, so that the person in charge of a following vehicle can see the sign and come to a stop to allow the vehicle to turn out either to the right or to the left according to which of the signaling devices 11 is in use at the time. As soon as the solenoids 20 are deënergized then the armatures 21, the crossbar 22, rod 23 and crosshead 25 are moved to their normal position whereby a return swinging motion is imparted to the crank arm 29 to turn the shaft 30 in the reverse direction and thus swing the sign 32 into normal vertical position. It is understood that this return movement of the sign is aided by the weight of the sign. On the top of the guideways 26 is mounted an electrical alarm 50 of any approved construction.

In practice, the two signaling devices are preferably controlled from the steering wheel 60 of the automobile or other vehicle and for this purpose the following arrangement is made: On the steering wheel 60 are mounted two push buttons or other switches 61, 62 electrically connected with a battery or other source of electrical energy 63 and also connected with the solenoids 20, the lamps 40 and the alarm 50, as plainly indicated in Fig. 6, so that when either push button is pressed the corresponding signaling device 11 is actuated and hence the corresponding sign 32 is swung out to indicate which way the vehicle is intended to turn out. At the same time the corresponding electric lamp 40 is lighted and the corresponding alarm 50 is sounded thus giving both visual and audible signals to a following vehicle. The cap section of the casing 12 is provided with suitable ventilating openings 70.

The device shown and described is very simple and durable in construction and can be readily applied to the various makes of automobiles, auto-trucks and similar vehicles.

Having thus described my invention, I claim as new and desire to secure by Letters Patent:

1. In a signaling device, a casing including a cup shaped section having a floor, a solenoid mounted on the floor therebeneath, and having a movable armature provided with a rod slidably extending through an opening in the floor, a crosshead carried by the rod above the floor, a cross head guideway having an alarm mounted thereon, said guideway mounted on the floor thereabove, a shaft operable by the crosshead, and journaled in the walls of the cup-shaped section and extending to the outside thereof, a sign carried by the outer end of the shaft and movable by said shaft into inactive and display positions, a cap section forming a portion of the casing mounted above and detachably secured to the said cup section, and housing the parts above the floor, and a lower casing section mounted below and detachably secured to the cup section, and housing the parts below the floor.

2. In a signaling device, a casing including a cup-shaped member having a floor and having means whereby the casing may be attached to a vehicle, a signal mounted on the cup-shaped member without the same, operating mechanism for the signal mounted in the casing on the said floor and including parts arranged above said floor, and parts arranged below said floor, a cap member forming a portion of the casing and arranged above and detachably secured to the cup member, and housing the parts above the floor, and a lower casing member arranged below and detachably secured to the cup and housing the parts below the floor.

In testimony whereof I have signed my name to this specification in the presence of two subscribing witnesses.

THOMAS RICHARDSON.

Witnesses:
H. L. OUBIE,
A. H. VENET.

Copies of this patent may be obtained for five cents each, by addressing the "Commissioner of Patents, Washington, D. C."